United States Patent
Chihara et al.

(10) Patent No.: US 6,724,112 B2
(45) Date of Patent: Apr. 20, 2004

(54) MOTOR

(75) Inventors: Yukio Chihara, Mie (JP); Mizuo Komine, Nara (JP); Hiroshi Kitamura, Mie (JP); Takeshi Hashimoto, Mie (JP); Hiroshi Wada, Mie (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 10/093,585

(22) Filed: Mar. 7, 2002

(65) Prior Publication Data
US 2002/0185927 A1 Dec. 12, 2002

(30) Foreign Application Priority Data

Jun. 8, 2001 (JP) ........................... 2001-173673

(51) Int. Cl.[7] ................................................. H02K 5/00
(52) U.S. Cl. ............................................ 310/89; 310/90
(58) Field of Search ............................. 310/89, 90, 85; 384/626, 616

(56) References Cited

U.S. PATENT DOCUMENTS

| 1,635,319 | A | * | 7/1927 | Grill ........................... 310/178 |
| 2,345,952 | A | | 4/1944 | Smith ........................... 384/493 |
| 2,819,417 | A | * | 1/1958 | Glass ........................... 310/258 |
| 3,447,239 | A | | 6/1969 | Slick ............................. 29/596 |
| 3,944,863 | A | * | 3/1976 | Apsit et al. ................... 310/168 |
| 4,629,919 | A | * | 12/1986 | Merkle ......................... 310/90 |
| 5,001,377 | A | | 3/1991 | Parkinson .................... 310/90 |
| 6,087,746 | A | * | 7/2000 | Couvert et al. ............ 310/60 R |
| 6,091,173 | A | * | 7/2000 | Byrd ............................ 310/85 |
| 6,297,571 | B1 | * | 10/2001 | Knappenberger ......... 310/60 R |

FOREIGN PATENT DOCUMENTS

| DE | 3026835 | 2/1982 |
| DE | 3344249 | 4/1985 |
| DE | 19615889 | 10/1997 |
| EP | 0650058 | 4/1995 |

OTHER PUBLICATIONS

European Search Report for EP 02 00 4392, dated Aug. 19, 2002.

* cited by examiner

Primary Examiner—Nicholas Ponomarenko
Assistant Examiner—Leda Pham
(74) Attorney, Agent, or Firm—RatnerPrestia

(57) ABSTRACT

A cup ring and a holding-plate are disposed at each side of a front bracket of a stator of a motor, to fix in place an outer ring of a front ball-bearing of the rotor of the motor in order to prevent creep between a bearing housing and the outer ring. A thickness of a end bearing shim is adjusted such that a distance between an end portion of a tube section of the cup ring and a first end face of the outer ring is less than 0.1 mm. The holding plate is temporarily fixed to a given place of the motor shaft, and then screwed down thereto with a screw, so that the holding plate moves and solidly contacts the outer ring of the front ball bearing. An outer diameter of the motor shaft extending between the given place and the bearing is smaller than a center hole of the holding plate such that the holding plate does not contact the motor shaft.

7 Claims, 4 Drawing Sheets

MOTOR

FIELD OF THE INVENTION

The present invention relates to a motor employing a ball bearing, more particularly relates it to a bearing structure of the motor, where unbalance load in a radial direction or thrust force in an axial direction is applied to the bearing.

BACKGROUND OF THE INVENTION

Recently, a motor of industrial-use is not only used for driving a conveyor and the like, but also used in variety of applications such as a robot or a pump, and the motors used in those machines work continuously for long hours. The market requires a ball bearing employed in those motors to have a longer service life because eccentric load in a radial direction or thrust force in an axial direction is applied to a motor shaft.

A motor with a ball bearing uses a wave washer in order to apply appropriate pre-load to the ball bearing, so that a longer service life of the ball bearing can be expected. A little space is provided between an outer ring of the ball bearing and a housing of the bearing to make the assembly a bit loose for pre-loading the ball bearing in the axial direction and for absorbing dimensional tolerance of the parts used in the motor.

A bearing structure of a conventional motor, which is employed for driving a conveyor, is described hereinafter with reference to FIG. 4. In FIG. 4, rotor iron-core 17 is rigidly fit to motor shaft 16, and stator iron-core 19 with coils is rigidly fit to frame 18. Rear bracket 20 and front bracket 21 are mounted to an opening of frame 18, and each of the brackets has a bearing housing at its center. Each of inner rings of rear ball bearing 22 and front ball bearing 23 is rigidly fit to motor shaft 16, and an outer ring of rear ball bearing 22 is rigidly bonded to the bearing housing disposed at rear bracket 20. An outer ring of front ball bearing 23 is not bonded. Wave washer 24 is inserted in front of bearing 23, so that the ball bearing is pre-loaded by the spring pressure.

The structure discussed above, however, invites creep to the outer ring of the front ball bearing because the outer ring is simply left loose and pre-loaded by the wave washer. In particular, when unbalance load is applied in the radial direction, the outer ring becomes more subject to the creep, thereby reducing the service life of the bearing.

In the case of a servo-motor equipped with an optical encoder at its shaft, when the shaft moves in the axial direction against the pre-load by the wave washer, a rotary section and a stationary section of the encoder come into contact with each other, which may damage the encoder.

SUMMARY OF THE INVENTION

The present invention addresses the problems discussed above, and aims to provide a motor, of which ball bearing is prevented from creep at its outer ring, usable in variety of applications.

A motor of the present invention comprises the following elements:
 a cup ring disposed before a front bracket; and
 a holding plate disposed behind the front bracket.
The cup ring and the holding plate sandwich the front bracket, and the cup ring and the plate are screwed down to the front bracket so that the outer ring of the front ball bearing is tightly sandwiched and cannot move. As a result, this structure prevents the outer ring from incurring creep.

DETAILED DESCRIPTION OF THE PREFERRED EMBODIMENT

A servo-motor having a helical gear on a motor shaft is demonstrated hereinafter as an exemplary embodiment of the present invention.

Figure 1:
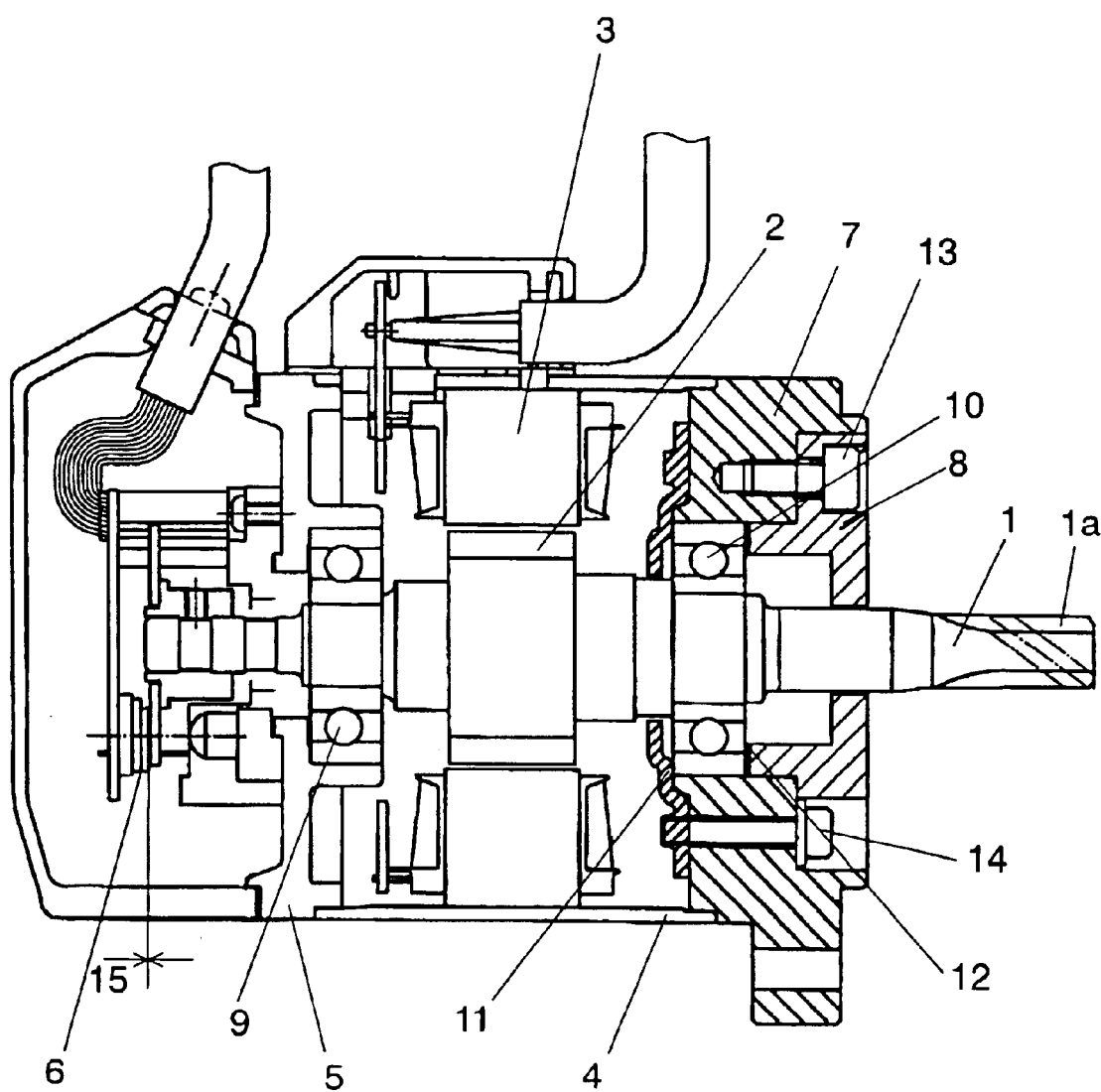
FIG. 1 is a sectional view of a motor in accordance with an exemplary embodiment of the present invention.

In FIG. 1, rear ball-bearing 9 and front ball-bearing 10 are press-fitted to motor shaft 1, and an outer ring of rear balling bearing 9 is fitted to a bearing housing disposed at rear bracket 5 by a shrink-fit method. An outer ring of front ball bearing 10 is loosely fit to a bearing housing of front bracket 7. Motor shaft 1, near to the rear end of front ball bearing 10, has a specific section of which rim is fitted into a center hole punched in a holding plate. An outer rim of shaft 1 extending between this section and the front ball bearing is smaller than the center hole of the holding plate.

Figure 2:
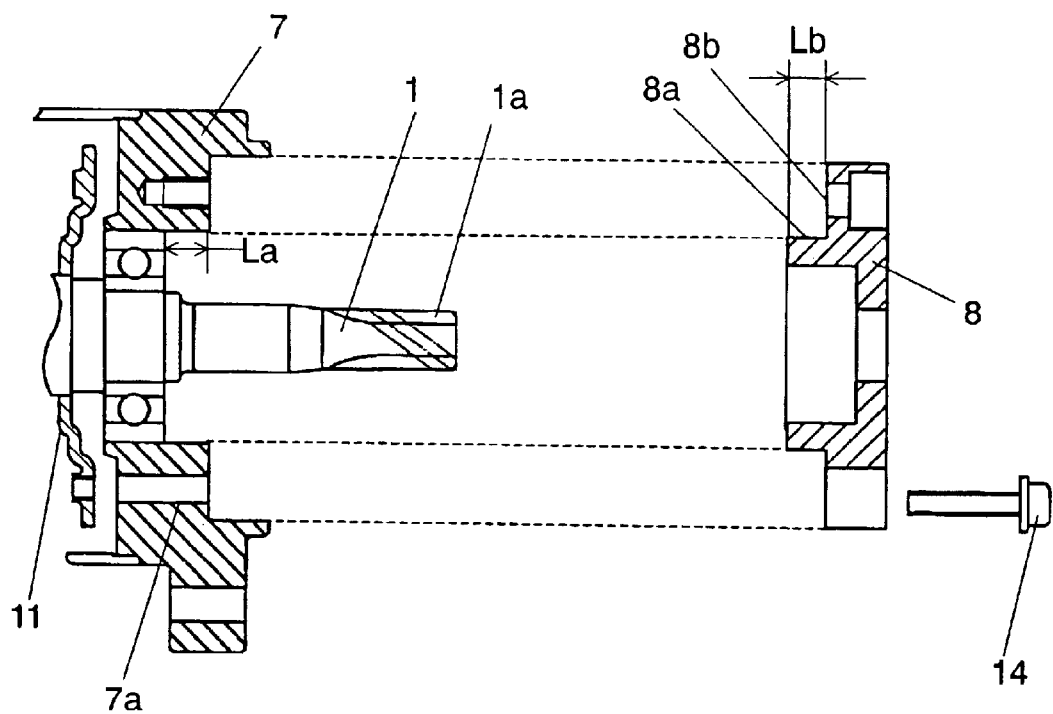
FIG. 2 is a schematic view illustrating how to adjust an axial space in the embodiment.

The motor is assembled in the following way:

(a) First, bond rotor magnet 2 to the widest rim of motor shaft 1, (b) second, fit the center hole of holding plate to the specific section of motor shaft 1 for fixing temporarily holding plate 11 to motor shaft 1 (refer to FIG. 2), (c) press-fit the respective inner rings of rear ball bearing 9 and front ball bearing 10 into given places of motor shaft 1.

The steps below follow the steps discussed above.

(d) insert the outer ring of rear ball bearing 9 into the bearing housing of rear bracket 5 heated, whereby the outer ring of bearing 9 is fitted to the housing by the shrink-fit method, then (e) insert motor shaft 1 mounted with rear bracket 5 into a hollow section of frame 4 to which stator iron-core 3 is fitted by the shrink-fit method, (f) fit rear-bracket 5 into an opening of frame 4 and fix bracket 5 to frame 4 with screws (not shown), then (g) mount front-bracket 7 to the opposite opening of frame 4, at this time, the outer ring of front ball bearing 10 is not fixed to the bearing housing of front-bracket 7, (h) sandwich tightly the outer ring of front bearing 10 between cup-ring 8 and holding plate 11 for avoiding creep between the outer ring of bearing 10 and the bearing housing.

During this assembly process (h) for avoiding the creep, an axial clearance between both the bearings, i.e., the axial clearance of motor shaft 1, is adjusted by adjusting a thickness of bearing shim 12. The assembly process (h) includes the following steps:

(1) measure distance "La" from the front end of the outer ring of bearing 10 to the front end of the bearing housing of front bracket 7, and measure length "Lb" of tube section 8a of cup ring 8;

(2) insert bearing-shim 12 into the bearing housing of front bracket 7, where a thickness of shim 12 has been adjusted, based on the La and Lb measured, such that the clearance between an end portion of tube section 8a and an end face of the outer ring of bearing 10 falls within the range from 0.02 to 0.1 mm after the motor is assembled, (3) insert tube section 8a of cup ring 8 into the bearing housing of front bracket 7, and fix flange section 8b to front bracket 7 with screws 13, and (4) align the two screw-sections of holding plate 11 (shown in FIG. 2) apart by 180 degree with two holes 7a provided to front bracket 7 by rotating motor shaft 1, then fix holding plate 11 to front bracket 7 with screws 14. Plate 11 has been temporarily mounted to motor shaft 1.

Figure 3A:
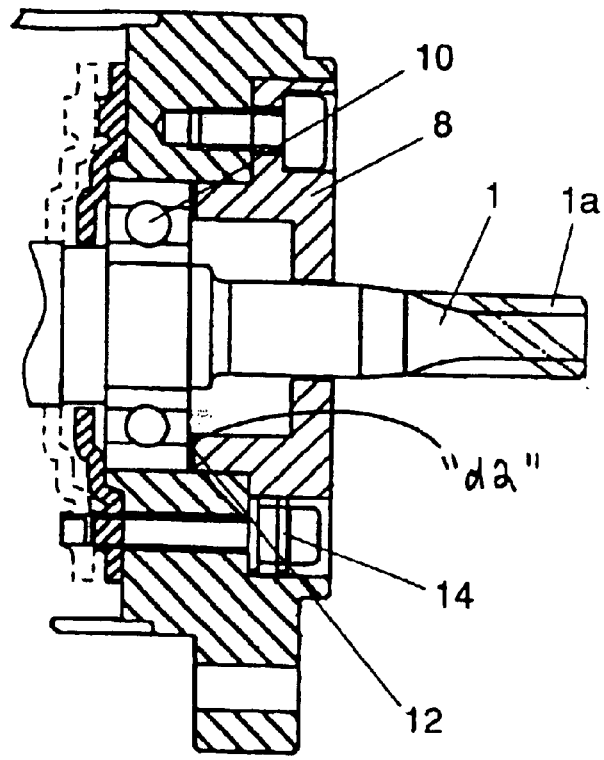
FIG. 3A shows a structure of a front bearing in accordance with the embodiment of the present invention.

As shown in FIG. 3A, holding plate 11 drawn with broken lines moves forward to solidly contact with front bracket 7 and the outer ring of front bearing 10. An outer diameter of motor shaft 1 adjacent to the front bearing is smaller than the center hole of plate 11, so that plate 11 is spaced from shaft 1. Cup ring 8 and plate 11 sandwich tightly the outer ring of front bearing 10, the motor in accordance with this embodiment is thus finally assembled. When helical gear "1a" provided to shaft 1 is engaged with a reduction gear, the motor works as a geared motor.

Figure 3B:
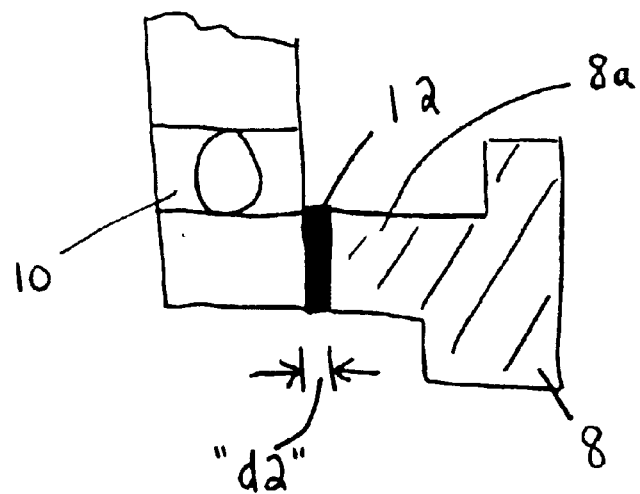
FIG. 3B is a detailed view of a portion of the structure of FIG. 3A.
Figure 4:
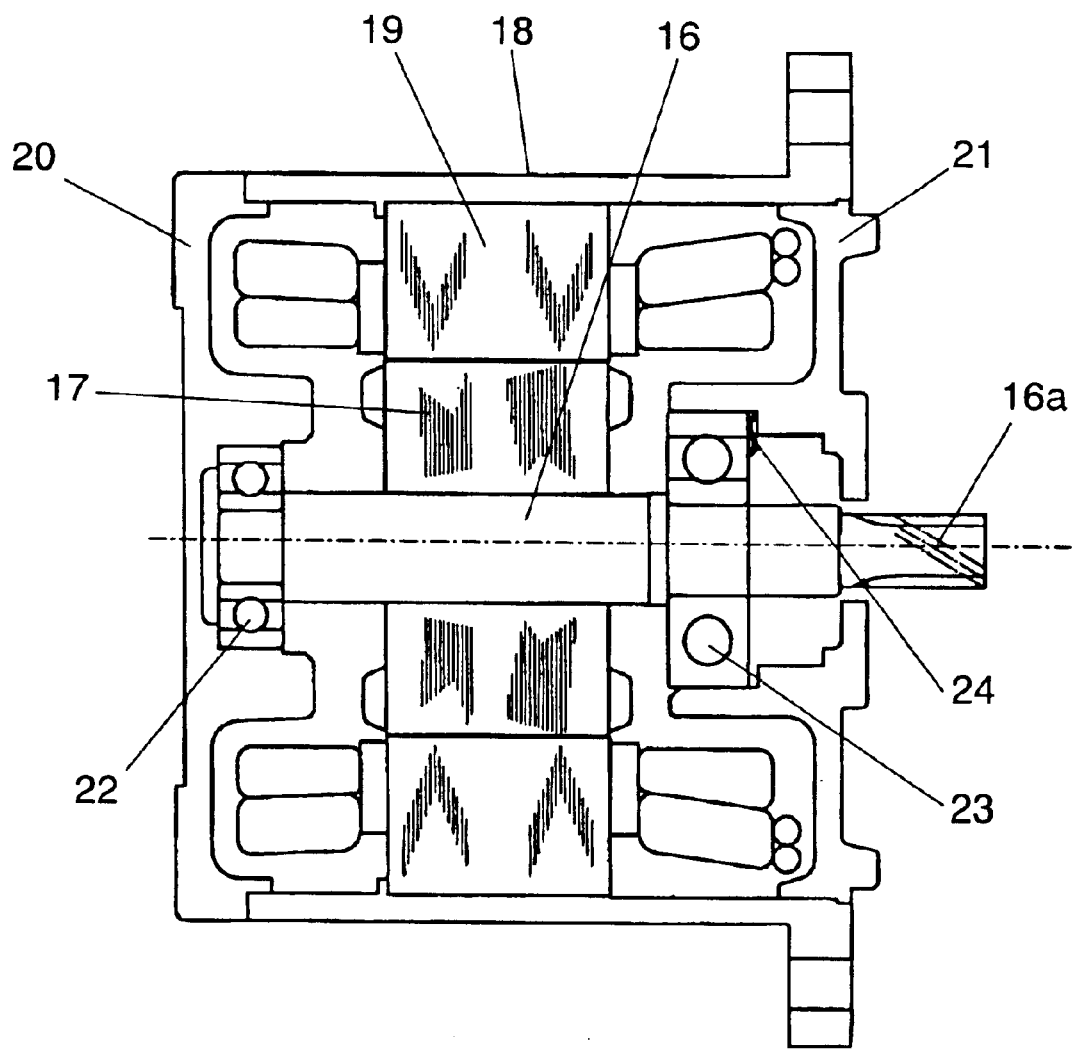
FIG. 4 is a sectional view of a conventional motor.

FIG. 3B is a detailed view of a portion of the structure of FIG. 3A. The distance marked "d2" is the distance between an end portion of tube section 8a and an end face of the outer ring of front ball bearing 10. This distance is preferably in the range of 0.02 to 0.1 mm after the motor is assembled.

Since the ball bearings on both sides are rigidly fixed, this motor well suits for an application, in which unbalance load in the radial direction is applied to the ball bearings, such as a diaphragm pump which reciprocates a diaphragm to exhaust air or a blower which spins blades subject to unbalance.

Service life of a motor largely depends on service lives of sliding sections and rotating sections of mechanical parts, therefore, the motor of the present invention advantageously has a long life because it is free from creep at the ball bearings.

If axial force is applied to the shaft, the shaft cannot move greater than the axial clearance. Therefore, this motor well suits for an application where axial force is always applied to the motor shaft. For instance, a reduction gear having a helical gear is mounted to the motor shaft, so that the motor can rotate in a forward and a reverse directions repeatedly.

The motor in accordance with this embodiment comprises:

rear bracket 5 mounted with a stationary section of encoder 6; and motor shaft 1 mounted with a rotary section of encoder 6.

Space 15 between the stationary section and the rotary section is adjusted to be approx. 0.15 mm (refer to FIG. 1). The axial clearance between the end portion of tube section 8a and an end face of the outer ring of front ball bearing 10 is determined to be not greater than 0.1 mm. Therefore, the rotary section and the stationary section of encoder 6 are not brought into contact with each other.

The structure discussed in this embodiment is not limited to a servo-motor, but it is applicable to other motors such as an induction motor.

What is claimed is:

1. A motor comprising:

(a) a rotor including a front ball bearing and a rear ball bearing both being fixed to a motor shaft;

(b) a stator including a front bracket and a rear bracket, the front ball bearing being positioned in a front bearing housing of the front bracket, and the rear ball bearing being positioned in a rear bearing housing of the rear bracket;

(c) a bearing shim;

(d) a cup ring having a flange section and a tube section, the cup ring being provided at least partially within the front bearing housing such that the flange section is in contact with a surface of the front bracket, and an end portion of the tube section in contact with a first end face of an outer ring of the front ball bearing via said bearing shim;

(e) a holding plate in contact with a second end face of the outer ring of the front ball bearing, and (f) at least one fastener coupling either said flange section to said front bracket or said front bracket to said holding plate, such that the cup ring and said holding plate are provided on opposite sides of the front bracket, thereby holding the outer ring of the front bearing between the cup ring and said holding plate.

said bearing shim being provided between the end portion of the tube section and the first end face of the outer ring of the front ball bearing, said at least one fastener being tightened such that a distance between the end portion of the tube section and the first end face of the outer ring of the front ball bearing is less than or equal to 0.1 mm.

2. The motor of claim 1, wherein inner rings of the front ball bearing and the rear ball bearing are press-fitted to the motor shaft; and an outer ring of the rear ball bearing is fixed to the rear bearing housing of the rear bracket.

3. The motor of claim 1, wherein the motor shaft includes a section, near a rear end of the front ball bearing, of which rim is fit into a center hole of said holding plate, and an outer rim of the motor shaft extending between the section and the front ball bearing is smaller than the center hole of said holding plate.

4. The motor of claim 2 further comprising a helical gear mounted to the motor shaft.

5. The motor of claim 2 further comprising an optical encoder mounted to the motor shaft at an outside of the rear ball bearing.

6. A diaphragm pump that employs the motor of claim 1.

7. A diaphragm pump that employs the motor of claim 2.

* * * * *

UNITED STATES PATENT AND TRADEMARK OFFICE
CERTIFICATE OF CORRECTION

PATENT NO. : 6,724,112 B2 Page 1 of 1
DATED : April 20, 2004
INVENTOR(S) : Chihara et al.

It is certified that error appears in the above-identified patent and that said Letters Patent is hereby corrected as shown below:

Column 4,
Line 21, after "section" insert -- is --.
Line 32, after "plate" delete the "." and insert -- , --.

Signed and Sealed this

Twenty-ninth Day of March, 2005

JON W. DUDAS
*Director of the United States Patent and Trademark Office*